Figure 1:
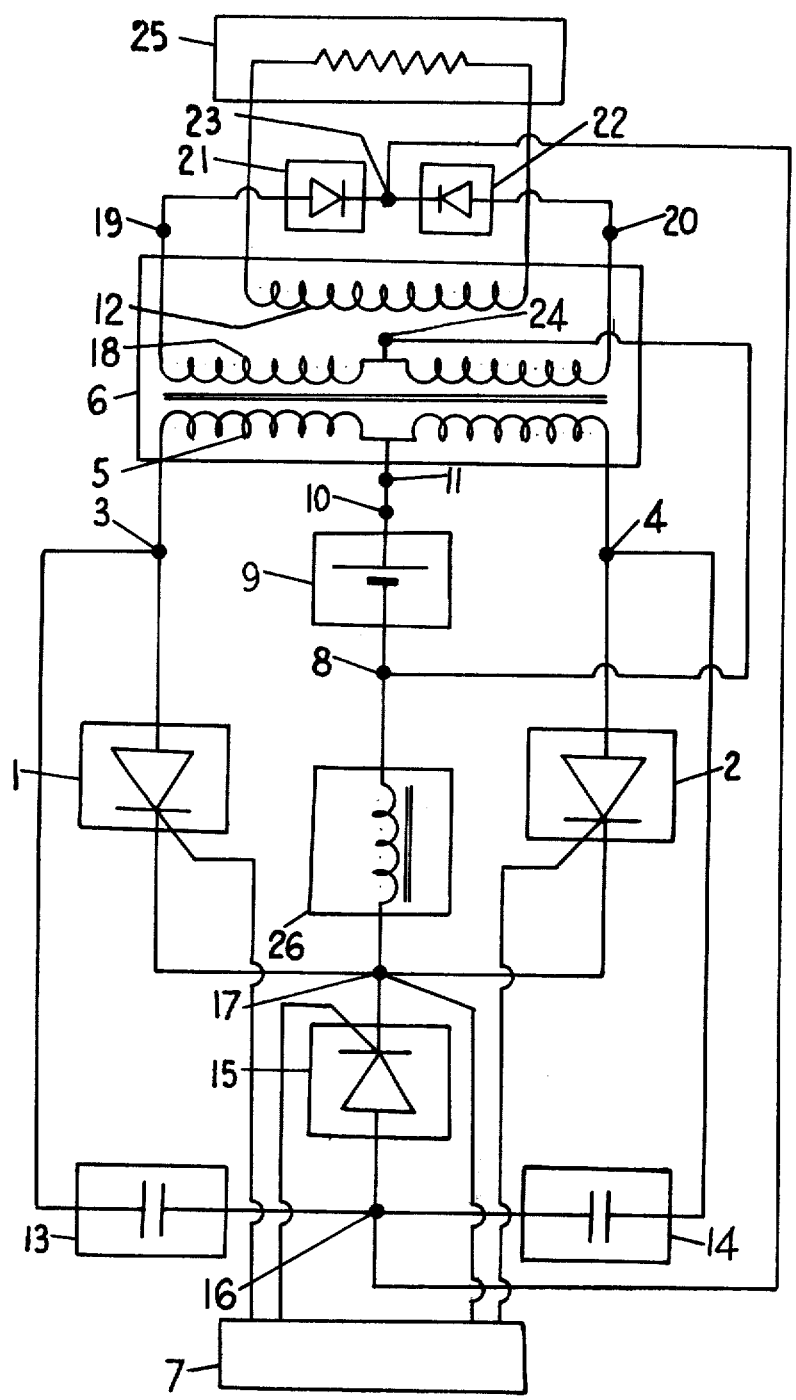

United States Patent

Rao et al.

[11] 3,891,913
[45] June 24, 1975

[54] INVERTER

[76] Inventors: Hattangady Vasanth Rao; Ravindra Nath Doss, both of c/o Telecommunication Research Centre, Posts and Telegraphs Khurshid Lal Bhavan, Janpath, New Delhi-1, India

[22] Filed: Apr. 5, 1973

[21] Appl. No.: 348,354

[52] U.S. Cl. .................. 321/45 R; 321/16
[51] Int. Cl. ........................... H02m 7/52
[58] Field of Search .......... 321/45 R, 45 C, 18, 16; 323/73; 307/252 C

[56] References Cited
UNITED STATES PATENTS

| | | | |
|---|---|---|---|
| 3,075,136 | 1/1963 | Jones | 321/45 R |
| 3,263,153 | 7/1966 | Lawn | 321/45 C |
| 3,315,146 | 4/1967 | Paice | 321/45 R |
| 3,432,737 | 3/1969 | Hunter et al. | 321/45 R |
| 3,605,003 | 9/1971 | Guggi | 321/45 R |

FOREIGN PATENTS OR APPLICATIONS

| | | | |
|---|---|---|---|
| 410,159 | 10/1966 | Switzerland | 321/45 R |

Primary Examiner—William H. Beha, Jr.
Attorney, Agent, or Firm—Sughrue, Rothwell, Mion, Zinn and Macpeak

[57] ABSTRACT

In a parallel inverter system having a transformer with a commutating capacitor connected across its centre-tapped primary, a second commutating capacitor is connected in series with the first, an additional centre tapped auxiliary winding is provided on the transformer, and an auxiliary thyristor is provided between the junction of the said capacitors and the junction of the main thyristor of the inverter.

1 Claim, 2 Drawing Figures

INVERTER

This invention relates to an inverter, which is an electrical device for delivering an a.c. power output from a d.c. power input.

There are a number of conventional configurations for an inverter. One of the simplest among these is the parallel inverter in which two switching devices such as thyristors or transistors connected to the two ends of the primary winding of a transformer are alternately switched on by means of a control circuit to apply to each of the two ends of the primary winding one pole of a d.c. source, its other pole being connected to the centre tap of the primary winding. This results in the induction of an alternating voltage in a secondary winding of the transformer.

When the switching devices employed are transistors or equivalent devices the switching off of each device when the other is switched on can be achieved by the control circuit itself. In the case of thyristors or equivalent devices which cannot be switched off by the control circuit alone, the switching off of each thyristor is achieved by switching on the other thyristor and thereby applying to the former thyristor a reverse voltage built up on a commutating capacitor connected across the outer ends of the primary winding. A commutating inductance placed in series with the d.c. source supports the d.c. voltage during the instant when both thyristors are on and also helps to maintain the reverse voltage during the turn off period.

Though the arrangement is simple, by its very nature of operation the a.c. output is essentially a square wave with each half cycle covering full 180° of a 360° cycle. Therefore, such an inverter of conventional configuration particularly when its employs thyristors or equivalent devices for switching is not amenable to pulse width control, which involves half cycles in the output covering less than 180°.

The object of the present invention is to develop an inverter, which while retaining the simplicity of the parallel inverter, would enable pulse width control of the output voltage. While the invention can be used with any type of switching device it will be described herein below with particular reference to thyristors, which devices are the best suited to take advantage of the invention.

We have found that when thyristors are employed as switching devices, provision of an auxiliary winding in the transformer in conjunction with an auxiliary thyristor and an additional commutating capacitor enables each main thyristor to be switched off independently of the other and provides a low impedance path for flow of any reactive energy associated with the load during the interval when both thyristors are off. This enables pulse width control of the output thereby giving a ready means of regulating the output energy and harmonic content.

According to the present invention, there is provided an inverter comprising two thyristors connected to the two ends of the primary winding of a transformer which thyristors are alternately switched on by a control circuit to apply to each of the two ends of the primary winding one pole of a d.c. source, its other pole being connected to the centre tap of the primary winding, wherein a commutating capacitor is provided across the ends of the primary winding for commutation of the thyristors characterised in that an additional commutating capacitor is provided in series with the first mentioned commutating capacitor, an auxiliary thyristor is provided between the junction of the two commutating capacitors and the function of the first mentioned thyristors and a centre-tapped auxiliary winding is provided on the transformer with its ends connected together through two diodes in series opposition, with the junction of the diodes and the centre tape of the auxiliary winding connected across the auxiliary thyristor. Provision of the aforesaid additional commutating capacitor, auxiliary thyristor and auxiliary winding would enable each conducting half cycle of the output square wave to be reduced to less than the full 180° giving a stepped square wave across the load on the secondary winding of the transformer and further enables pulse width control of the output square wave and regulation of the output energy and harmonic content.

The invention includes within its scope the use of any switching device other than a thyristor, e.g., the transistor. Thus, for instance, three transistors can be used in place of the three thyristors. If the switching devices used are such that they can be switched off directly by the control circuit (for instance if transistors are used as switching devices) then the commutating capacitors can be dispensed with.

Figure 2:
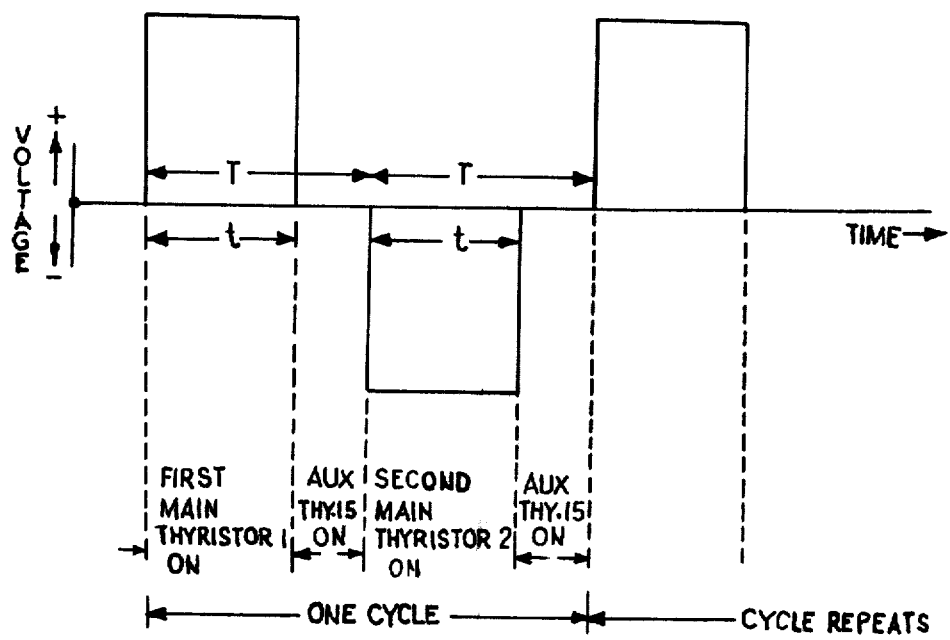

The invention will now be described with reference to thyristors with the help of accompanying drawings wherein FIG. 1 is a circuit diagram of the inverter, and FIG. 2 shows the wave form of the voltage output of the inverter.

The inverter (FIG. 1) has two thyristors 1, 2 connected to the two ends 3, 4 of the primary winding 5 of a transformer 6. The thyristors 1, 2 are alternately switched on by a control circuit 7 thereby applying to each of the two ends 3, 4 of the primary winding 5 one pole 8 of a d.c. source 9. The other pole 10 is connected to the centre tap 11 of the primary winding 5. This results in generation of an alternating voltage in a secondary winding 12. A commutating capacitor 13 with an additional commutating capacitor 14 in series is provided across the ends 3, 4 of the primary winding 5. An auxiliary thyristor 15 is provided between the junction 16 of the commutating capacitors 13, 14 and the junction 17 of the first mentioned thyristors 1, 2. A centre tapped auxiliary winding 18 is provided on the transformer 6 with its ends 19, 20 connected together through two diodes 21, 22 in series opposition. The junction 23 of the diodes 21, 22 and the centre tap 24 of the auxiliary winding 18 are connected across the auxiliary thyristor 15. Control of the connecting period of the auxiliary thyristor 15 enables each conducting half cycle of the output square wave to be reduced to less than the full 180° a stepped square wave of the form shown in FIG. 2 is made available across the load 25 on the secondary winding 12 of the transformer 6.

To assist in commutation, an inductance 26 is placed between the terminal 8 of the d.c. source 9 and the junction 17 of the thyristors 1, 2 and this inductance 26 is included in the loop connecting centre tap 24 of the auxiliary winding 18 and the junction 23 of the diodes 21, 22 across the auxiliary thyristor 15.

The operation of the present inverter is as follows:

i. The first main thyristor 1 is switched on by means of the control circuit 7 and it applies on pole 8 of the d.c. source 9 to the outer end 3 of the primary winding 5 of the transformer 6 while the other pole 10 remains connected to the centre tap 11 of the primary winding 5 resulting in
a. induction of a voltage in each half section of the auxiliary winding 12 in one direction,
b. induction of a voltage in each half section of the auxiliary winding 18 in one direction,
c. charging of the commutating capacitors 13, 14. For the polarity of d.c. source voltage shown, the polarity of charge is such that the end of the first commutating capacitor 13 connected to the outer end 3 of the primary winding 5 is negative and the end of the second commutating capacitor 14 connected to the outer end 4 of the primary winding 5 is positive with respect to the junction 16 of the capacitors 13, 14.

ii. At the end of a specified interval of time 't' from the switching on of the main thyristor 1, the auxiliary thyristor 15 is switched on by means of the control circuit 7 resulting in
a. switching off of the first main thyristor 1 due to the reverse voltage applied to it from the first commutating capacitor 13,
b. placement of the auxiliary winding 18 across the commutating inductance 26,
c. discharge of the first commutating capacitor 13 through the commutating inductance 26 whereby the reverse voltage on the first main thyristor 1 is maintained during its turn off time,
d. collapse of the voltage across the outer ends 3, 4 of the primary winding 5, across the outer ends 19, 20 of the auxiliary winding 18, and across the secondary winding 12 to nearly zero,
e. charging of the commutating capacitors 13, 14 to the voltage level of the d.c. source, the polarity of charge being reversed on the first commutating capacitor 13 and remaining the same on the second commutating capacitor 14 compared to polarity mentioned at (i) (c) above,
f. provision of a low impedance path through the auxiliary winding 18, diode 21 or 22, the auxiliary thyristor 15 and commutating inductance 26 for the flow of any reactive current that may be associated with the load 25.

iii. The second main thyristor 2 is switched on by means of the control circuit 7 after another specified interval of time 'T' (which is greater than *t*) after the switching on of the first main thyristor 1 resulting in
a. switching off of the auxiliary thyristor 15 due to reverse voltage applied by second commutating capacitor 14,
b. discharge of the second commutating capacitor 14 through the commutating inductance 26 whereby the reverse voltage on the auxiliary thyristor 15 is maintained during its turn off time,
c. repetition of the cycle of events in the same manner as mentioned at (i) above for the first thyristor 1 but with voltages induced in the various windings and across commutating capacitors being of reverse polarity as compared to the case at (i) above.

iv. The auxiliary thyristor 15 is then switched on after an interval of time *t* from the switching on of the second main thyristor 2 resulting in switching off of the second main thyristor 2 and the other cycle of events similar to those mentioned at (ii) above for the first thyristor but with the roles of commutating capacitors 13, 14 interchanged.

v. Repetition of the sequence of operations mentioned at (i) to (iv) above at intervals of time 2T producing in the secondary winding 12 of the transformer 6 a stepped square wave of alternating voltage of the form shown in FIG. 2 whose frequency is governed by time interval T set by the control circuit 7 and whose pulse width can be controlled by controlling the time interval *t* by means of the control circuit. Control of time interval *t* thus enables regulation of output energy and harmonic content.

In actual practice, it may be found necessary to provide feed back diodes or equivalent devices to ensure reliable operation under varying load conditions.

The main advantages of the present inverter particularly in comparison with a conventional inverter having a means of regulation either within itself (such as a bridge-inverter) or external to it (such as a chopper-inverter) are as follows:

a. Economy in the number of components.
b. Lower rating of many of the components.
c. Economy in cost which follows from (a) and (b) above.
d. Compactness and lower weight which also follows from (a) and (b) above.
e. Higher efficiency due to lower commutation losses and fewer components coming in the main path of power flow.
f. It lends itself to working in the minimum harmonic region, i.e. around 120° to 140° pulse width, and thus achieves economy in filtering where an a.c. sine wave output is to be derived.
g. It is more immune to load power factor resulting in reliable starting and operation under a wide range of load conditions.
h. Switching on and off of the inverter can be controlled at low energy level outside the main current path thus making the inverter particularly suitable for use in automatic industrial process control operations.
i. More suited for parallel operation with other inverters or commercial mains because flow of active and reactive power can be controlled independently by controlling periods T and *t* mentioned above.

The invention has a wide range of applications in the following typical fields:

a. For a.c. supply where primary power source available is essentially d.c. such as in railway coaches, aircraft etc.
b. For no-break a.c. supplies in telecommunication installations, defence installations, radio and T.V. transmitters and studios, hospital operating theatres, industrial plants etc. where uninterrupted continuity of the a.c. power supply has to be ensured.
c. For standby a.c. supplies operating on storage batteries during failures of commercial a.c. supply.
d. For d.c. to d.c. polarity and voltage converters and multiple d.c. supplies operating from single d.c. source in various industrial plants.

As compared with inverters hitherto proposed, an inverter according to this invention has numerous advantages such as:

a. economy in cost, compactness and lower weight owing to reduced number of components of relatively lower rating.
b. better performance such as low no-load losses, higher peak efficiency, high efficiency over a wide load range.
c. Permits switching on and off at low energy level without requiring operation of contactors or circuit breakers in the main power path.

What we claim is:

1. A parallel inverter comprising:

a transformer having primary, auxiliary and secondary windings closely coupled to each other, said secondary winding serving as AC output means, said primary winding divided into two equal portions, said two portions joined at a common centre point, said auxiliary winding divided into two equal portions, said two portions joined at a common centre point, a D.C. source having a live terminal and a return terminal, the live terminal connected to the centre point of the said primary winding, a pair of series connected first and second thyristors having their like terminals, such as cathodes or anodes, connected together and their remaining terminals, such as anodes or cathodes, connected across the said primary winding, an inductor connected between the junction of the said first and second thyristors and the return terminal of the D.C. source, a pair of series connected first and second commutating capacitors connected across the said primary winding, a third thyristor connected between the junction of the said commutating capacitors and the junction of the said first and second thyristors, all three thyristors having their like terminals together, a pair of series connected diodes having their like terminals, such as cathodes or anodes connected together and their remaining terminals, such as anodes or cathodes, connected across the said auxiliary winding, with common centre point of the said auxiliary winding and the junction of the said diodes electrically bridged across the said third thyristor and said inductor in series, the conducting directions of the said diodes and the said third thyristor being same around the loop so formed, and a control circuit to which the gates and cathodes of the said first, second and third thyristors are connected.

* * * * *